United States Patent
Protsailo et al.

(10) Patent No.: US 9,761,899 B2
(45) Date of Patent: Sep. 12, 2017

(54) FUEL CELL ELECTRODE WITH GRADIENT CATALYST STRUCTURE

(75) Inventors: Lesia V. Protsailo, Bolton, CT (US); Laura Roen Stolar, South Windsor, CT (US); Jesse M. Marzullo, Enfield, CT (US); Mallika Gummalla, Longmeadow, MA (US); Sergei F. Burlatsky, West Hartford, CT (US)

(73) Assignee: Audi AG, Ingolstadt (DE)

( * ) Notice: Subject to any disclaimer, the term of this patent is extended or adjusted under 35 U.S.C. 154(b) by 340 days.

(21) Appl. No.: 14/373,299

(22) PCT Filed: Jan. 20, 2012

(86) PCT No.: PCT/US2012/021972
§ 371 (c)(1),
(2), (4) Date: Jul. 18, 2014

(87) PCT Pub. No.: WO2013/109283
PCT Pub. Date: Jul. 25, 2013

(65) Prior Publication Data
US 2014/0356757 A1 Dec. 4, 2014

(51) Int. Cl.
*H01M 8/04* (2016.01)
*H01M 8/1004* (2016.01)
(Continued)

(52) U.S. Cl.
CPC ....... *H01M 8/1004* (2013.01); *H01M 4/8636* (2013.01); *H01M 4/8642* (2013.01);
(Continued)

(58) Field of Classification Search
CPC ....................................................... H01M 8/02
See application file for complete search history.

(56) References Cited

U.S. PATENT DOCUMENTS 6,277,513 B1 8/2001 Swathirajan et al.
6,835,479 B2 12/2004 Balliet et al.
(Continued)

FOREIGN PATENT DOCUMENTS

CN 1201554 A 12/1998
EP 1 045 467 A1 10/2000
(Continued)

OTHER PUBLICATIONS

International Search Report, mailed Oct. 12, 2012, for International Application No. PCT/US2012/021972, 7 pages.

*Primary Examiner* — Jacob Marks
(74) *Attorney, Agent, or Firm* — Seed IP Law Group LLP

(57) ABSTRACT

An example of a stable electrode structure is to use a gradient electrode that employs large platinum particle catalyst in the close proximity to the membrane supported on conventional carbon and small platinum particles in the section of the electrode closer to a GDL supported on a stabilized carbon. Some electrode parameters that contribute to electrode performance stability and reduced change in ECA are platinum-to-carbon ratio, size of platinum particles in various parts of the electrode, use of other stable catalysts instead of large particle size platinum (alloy, etc), depth of each gradient sublayer. Another example of a stable electrode structure is to use a mixture of platinum particle sizes on a carbon support, such as using platinum particles that may be 6 nanometers and 3 nanometers. A conductive support is typically one or more of the carbon blacks.

17 Claims, 2 Drawing Sheets

(51) Int. Cl.
  *H01M 4/86* (2006.01)
  *H01M 4/90* (2006.01)
  *H01M 4/92* (2006.01)
  *H01M 4/88* (2006.01)
  *H01M 8/1018* (2016.01)

(52) U.S. Cl.
  CPC ....... *H01M 4/8652* (2013.01); *H01M 4/8657* (2013.01); *H01M 4/9083* (2013.01); *H01M 4/926* (2013.01); *H01M 4/881* (2013.01); *H01M 4/886* (2013.01); *H01M 4/8807* (2013.01); *H01M 2008/1095* (2013.01)

(56) References Cited

U.S. PATENT DOCUMENTS

| | | | |
|---|---|---|---|
| 7,901,836 | B2 | 3/2011 | Ohma et al. |
| 2002/0192535 | A1 | 12/2002 | Fukuda et al. |
| 2004/0038808 | A1 | 2/2004 | Hampden-Smith et al. |
| 2006/0135359 | A1 | 6/2006 | Adzic et al. |
| 2007/0231675 | A1 | 10/2007 | Son |
| 2007/0292744 | A1* | 12/2007 | Lopez ................ B01J 23/468 429/418 |
| 2008/0038615 | A1* | 2/2008 | Son ..................... H01M 4/8605 429/483 |
| 2008/0292933 | A1* | 11/2008 | Yu ........................ H01M 4/90 429/483 |
| 2011/0143254 | A1 | 6/2011 | Kongkanand et al. |
| 2011/0159403 | A1 | 6/2011 | Karulkar |
| 2011/0287327 | A1* | 11/2011 | Salvador ................ G01M 3/26 429/400 |
| 2011/0318661 | A1* | 12/2011 | Uensal ................ H01M 4/8636 429/428 |

FOREIGN PATENT DOCUMENTS

| | | |
|---|---|---|
| EP | 1450426 A1 | 8/2004 |
| JP | 2004-111191 A | 4/2004 |
| JP | 2005-141920 A | 6/2005 |
| JP | 2006-079917 A | 3/2006 |
| JP | 2007-305427 A | 11/2007 |
| WO | 97/13287 A2 | 4/1997 |
| WO | 2011/115012 A1 | 9/2011 |

\* cited by examiner

FUEL CELL ELECTRODE WITH GRADIENT CATALYST STRUCTURE

BACKGROUND OF THE DISCLOSURE

This disclosure relates to stable electrode structures and, more particularly, a stable, high activity catalyst for use in fuel cells.

Fuel cells are commonly known and used for generating electric power. For example, a fuel cell typically includes an anode electrode which includes an anode catalyst. The anode catalyst is typically supported on a support material such as carbon. A cathode electrode includes a supported cathode catalyst. An electrolyte is arranged between the anode electrode and the cathode electrode for generating an electric current in an electrochemical reaction sustained by a fuel and an oxidant supply through gas diffusion layers (GDL), which typically face the electrode surface on a side opposite the membrane surface. One example electrolyte is a proton exchange membrane (PEM).

One problem associated with fuel cells is the loss of electrochemical surface area (ECA) of the electrode catalysts and the corresponding loss of fuel cell performance. This ECA loss is associated with several key factors: Ostwald Ripening, platinum dissolution/deposition and platinum agglomeration associated with carbon corrosion. In addition, this loss in ECA is exacerbated by the operations effects of fuel cell potential cycling encountered in typical automobile and bus driving cycles.

To date, the most beneficial solutions to this problem have been to control fuel cell potential limits and the reactant environment within the cell during operation as well as start up and shut down (for example, see U.S. Pat. No. 6,835,479 "SYSTEM AND METHOD FOR SHUTTING DOWN A FUEL CELL POWER PLANT"). What is needed is a stable electrode structure and, more particularly, a stable, high activity catalyst for use in fuel cells.

SUMMARY OF THE DISCLOSURE

An example of a stable electrode structure is to use a gradient electrode that employs large platinum particle catalyst in the close proximity to the membrane supported on conventional carbon and small platinum particles in the section of the electrode closer to a GDL supported on a stabilized carbon. Some electrode parameters that contribute to electrode performance stability and reduced change in ECA are platinum-to-carbon ratio, size of platinum particles in various parts of the electrode, use of other stable catalysts instead of large particle size platinum (alloy, etc), depth of each gradient sublayer.

Another example of a stable electrode structure is to use a mixture of platinum particle sizes on a carbon support, such as using platinum particles that may be 6 nanometers and 3 nanometers. A conductive support, usable in the present disclosure, is typically one or more of the carbon blacks. They may be furnace black, lamp black, acetylene black, channel black, thermal black, or the like. The carbon support may be conventional carbon such as Vulcan® XC72 (Cabot Corp.) with a typical surface area of ~240 meters$^2$/gram or a stabilized carbon, such as graphitized Vulcan® (Vulcite®) with a surface area of ~80 m$^2$/g.

BRIEF DESCRIPTION OF THE DRAWINGS

The disclosure can be further understood by reference to the following detailed description when considered in connection with the accompanying drawings wherein.

DETAILED DESCRIPTION

Figure 1:
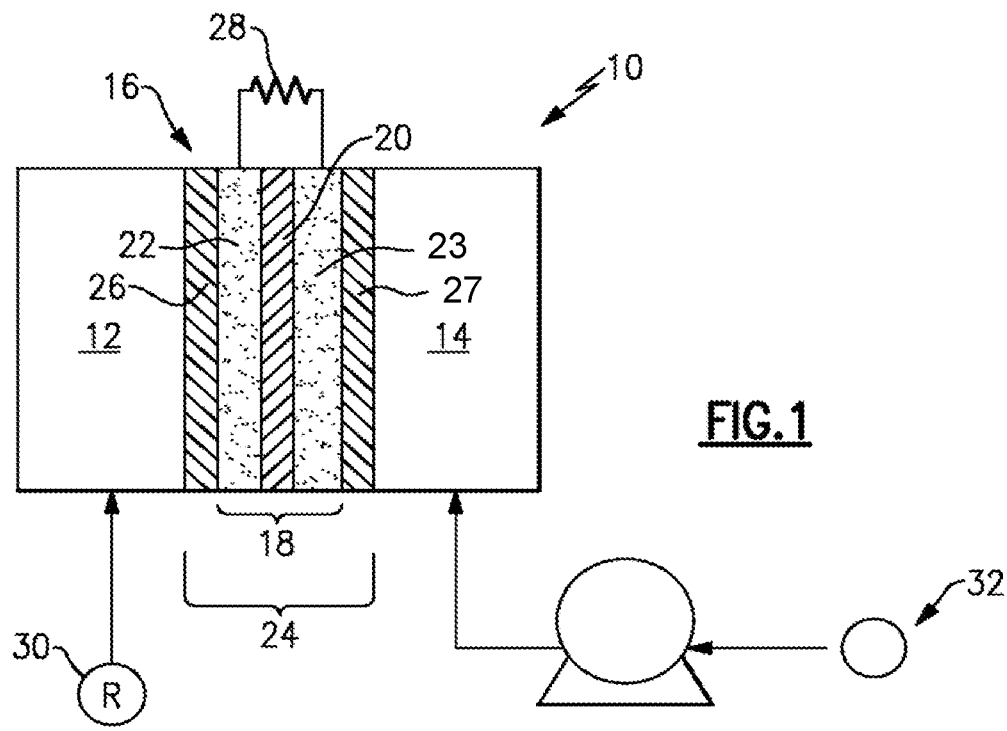
FIG. 1 is a schematic view of an example fuel cell.

FIG. 1 schematically depicts a fuel cell 10 having an anode plate 12 and a cathode plate 14 arranged on either side of an unitized electrode assembly 24. The unitized electrode assembly 24 includes a membrane electrode assembly 18 having a proton exchange membrane 20 arranged between an anode catalyst 22 and cathode catalyst 23 and also includes an anode gas diffusions layer 26 and a cathode gas diffusion layer 27.

A reactant source 30, which may provide a fuel such as hydrogen, supplies reactant to the anode plate 12. An oxidant source 32, such as air, is provided to the cathode plate 14. An electrochemical reaction within the membrane electrode assembly 18 provides current through a load 28, as known in the art.

Figure 2:
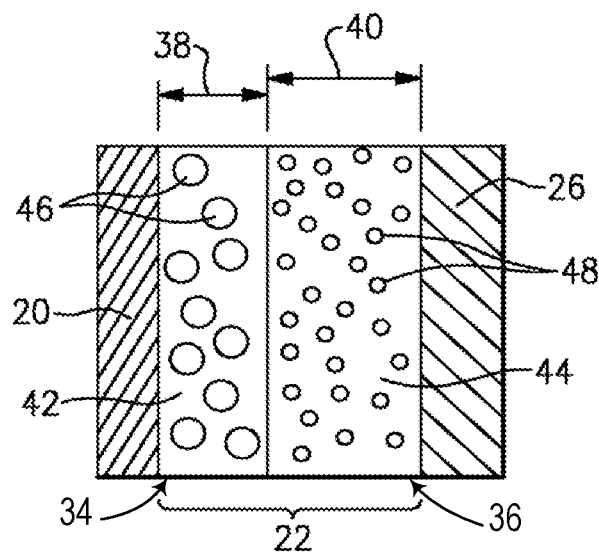
FIG. 2 is a schematic view of a portion of an example electrode assembly.

Referring to FIG. 2, an example anode catalyst 22 is shown. It should be understood that the cathode catalyst 23 may be similarly constructed. The anode catalyst 22 is provided by one or more layers, which includes at least first and second layers 34, 36. Each layer includes a mixture including an ionomer, a conductive support material and catalyst particles. The ionomer is Nafion® in one example. The catalyst particle size is different in each layer. In the example, the first layer 34 is arranged adjacent to the proton exchange membrane 20, and the second layer 36 is arranged adjacent to a gas diffusion layer 26.

In one example, the first and second layers 34, 36 respectively include first and second support materials 42, 44. The first and second support materials 42, 44 may be different than one another and may be provided by a carbon material, such as carbon black, for example, furnace black, lamp black, acetylene black, channel black, or thermal black. In one example, the first support material 42 is a stabilized carbon, such as a graphitized carbon, for example, Vulcite® with a surface area of approximately 80 m$^2$/g, for example. The second support material 44 is constructed from a conventional carbon, such as Vulcan®0 XC72 (Cabot Corp.) with a typical surface area of approximately 240 m$^2$/g, for example. In the example illustrated, the first and second support materials 42, 44 also may differ in that the first support material 42 has a first thickness 38 that is less than a second thickness 40 of the second support material 44.

The first and second catalyst particles 46, 48 differ from one another in that the first catalyst particles 46 have a first average particle size that is greater than the catalyst particles on the second support material 44, which has a second average particle size. In one example, the first and second catalyst particles 46, 48 are platinum, such as platinum black. The first and second catalyst particles 46, 48 may be provided by other transition metals and alloys thereof. In one example, the first average particle size is 4-10 nm, and in one example 6 nm. The second average particle size is, for example, 2-5 nm, and in one example 3 nm.

First and second layers 34, 36 are, by spraying the ionomer/support material/catalyst particles mixture onto the adjoining structure. In another example, a film transfer method can be used in which the layers are depositing onto a transfer film, and the layer is then transferred from the film to the structure. In one example, the first layer 34 is deposited onto the PEM 20 and the second layer 36 is deposited onto the first layer 34. In another example, the second layer 36 is deposited onto the GDL 26, and the first layer 36 is deposited onto the second layer 36 or the PEM 20.

The larger catalyst particles are arranged in the area of more aggressive dissolution—near the PEM. The smaller catalyst particles, located at the GDL, provide a performance benefit.

In one example, the first and second layers 34, 36 have approximately 50% porosity. In one example, the first layer 34 includes approximately 60 weight percent of first catalyst particles 46, and the second layer 36 includes approximately 50 weight percent of the second catalyst particles 48. In one example, the catalyst particle loading of the first and second layers 34, 36 is approximately 0.1-0.2 mg/cm².

In another example of a stable electrode structure, an anode catalyst is provided between a PEM and a GDL. A mixture of platinum particles are provided in a carbon support (along with an ionomer). The platinum particles may be 6 nanometers and 3 nanometers respectively intermixed with one another, rather than the discrete layers illustrated in FIG. 2, which can mitigate air transport losses.

Figure 3:
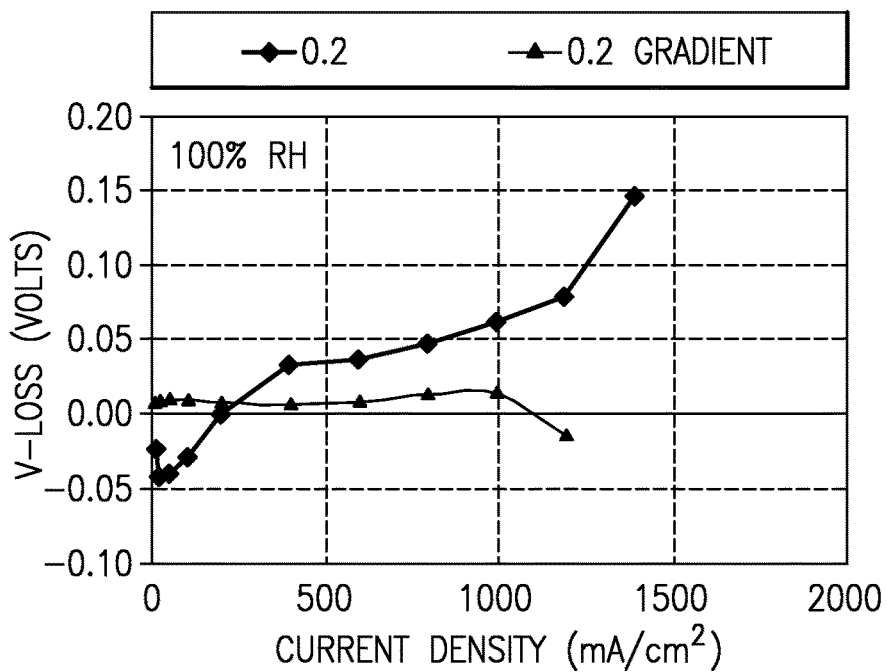
FIG. 3 is a chart depicting performance loss after 150 hours of durability cycling for a fuel cell utilizing a gradient catalyst in wet conditions.
Figure 4:
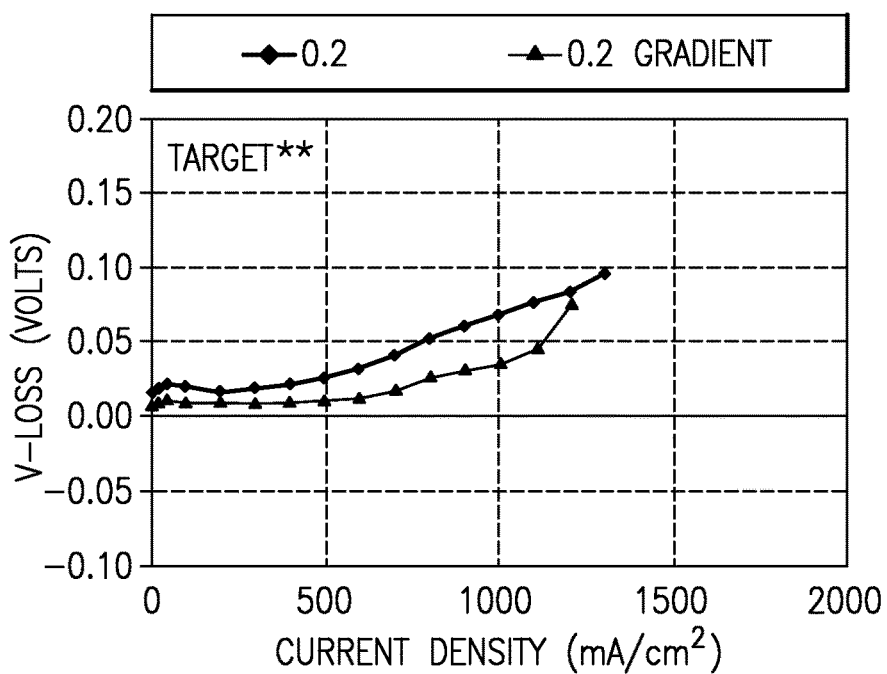
FIG. 4 is a chart depicting performance loss of a fuel cell utilizing a gradient catalyst as compared to a catalyst with homogenous loading after 150 hours of durability cycling.

Referring to FIGS. 3 and 4, charts illustrating the performance loss after 150 hours durability cycling of the example disclosed catalyst is shown as compared to a conventionally loaded catalyst. The results depicted in the chart relate to an example fuel cell with 0.2 mg/cm² platinum with a first layer having an electrochemical area per unit volume of catalyst of approximately 250,000 for a depth approximately 1.8 μm, and a second layer of 400,000 for a depth of 2.4 μm. FIG. 3 illustrates the performance loss after 150 hours of durability cycling is negligible for the gradient catalyst at wet conditions (100% RH). FIG. 4 illustrates the catalyst as tested under conditions including 37 dry dew point with 60° C. coolant and an operating pressure of 4040 kPa. The gradient catalyst tested exhibited negligible performance loss, only an 8% loss at 1000 mA/cm² after 150 hours.

Although a preferred embodiment has been disclosed, a worker of ordinary skill in this art would recognize that certain modifications would come within the scope of the claims. For that reason, the following claims should be studied to determine their true scope and content.

What is claimed is:

1. A fuel cell electrode assembly comprising:
   a first layer including a first conductive support material and first catalyst particles disposed in the first conductive support material, the first catalyst particles having a first average particle size, the first layer adjoining a proton exchange membrane;
   a second layer adjoining the first layer, the second layer including a second conductive support material and second catalyst particles disposed in the second conductive support material, the second catalyst particles having a second average particle size, the second layer adjoining a gas diffusion layer, the first average particle size larger than the second average particle size, wherein the first and second average particle sizes respectively are approximately 4-10 nm and 2-5 nm.

2. The fuel cell electrode assembly according to claim 1, wherein the first and second catalyst particles are transition metals.

3. The fuel cell electrode assembly according to claim 2, wherein the transition metal includes platinum.

4. The fuel cell electrode assembly according to claim 1, wherein the first and second average particle sizes are approximately 6 nm and 3 nm.

5. The fuel cell electrode assembly according to claim 1, wherein the first and second conductive support materials are different than one another.

6. The fuel cell electrode assembly according to claim 5, wherein the first and second conductive support materials respectively are a stabilized carbon and a carbon.

7. The fuel cell electrode assembly according to claim 5, wherein the first and second conductive support materials respectively include first and second thicknesses that are different than one another.

8. The fuel cell electrode assembly according to claim 5, wherein the first and second conductive support materials have an approximately 50% porosity.

9. The fuel cell electrode assembly according to claim 1, wherein the first and second layers respectively include the first and second catalyst particles corresponding to approximately 60 weight percent and 50 weight percent.

10. The fuel cell electrode assembly according to claim 1, wherein the platinum loading on the first and second layers is approximately 0.1-0.2 mg/cm².

11. A fuel cell electrode assembly comprising:
    a proton exchange membrane;
    a gas diffusion layer;
    a catalyst layer having a first surface and a second surface, the catalyst layer arranged between the proton exchange membrane and the gas diffusion layer, the first surface of the catalyst layer in direct contact with an adjoining surface of the proton exchange membrane and the second surface of the catalyst layer in direct contact with an adjoining surface of the gas diffusion layer, wherein the catalyst layer includes a conductive support material having first and second catalyst particles intermixed with one another and respectively of a first and second average particle size, the first average particle size larger than the second average particle size, the first and second average particle sizes respectively are approximately 4-10 nm and 2-5 nm.

12. The fuel cell electrode assembly according to claim 11, wherein the first and second catalyst particles are platinum.

13. The fuel cell electrode assembly of claim 1 wherein the first layer is formed from a mixture of an ionomer, the first conductive support material, and the first catalyst particles.

14. A fuel cell electrode assembly comprising:
    a proton exchange membrane;
    a gas diffusion layer;
    a first layer having a first thickness, the first layer includes a mixture including a first ionomer, a first conductive support material, and a plurality of first catalyst particles, the first catalyst particles having a first average particle size, the first layer adjoining the proton exchange membrane;
    a second layer adjoining the first layer and the gas diffusion layer, the second layer having a second thickness that includes a mixture including a second ionomer, a second conductive support material, and a plurality of second catalyst particles, the second catalyst particles having a second average particle size, the first average particle size larger than the second average particle size, the first and second average particle sizes respectively are approximately 4-10 nm and 2-5 nm.

15. The fuel cell electrode assembly of claim 14 wherein the first conductive support material and the second conductive support material include carbon.

16. The fuel cell electrode assembly of claim 14 wherein the first conductive support material includes a first composition of carbon and the second conductive support material includes a second composition of carbon, the first composition of carbon of the first conductive support material being different from the second composition of carbon of the second conductive support material.

17. The fuel cell electrode assembly of claim 14 wherein the first thickness of the first layer defined by the mixture including the first ionomer, the first conductive support material, and the plurality of first catalyst particles is less than the second thickness of the second layer defined by the mixture including the second ionomer, the second conductive support material, and the plurality of second catalyst particles.

* * * * *